Oct. 22, 1968  C. B. HAEGERT  3,407,382
BATTERY CLAMP BOLT MEANS
Filed May 11, 1967  2 Sheets-Sheet 1
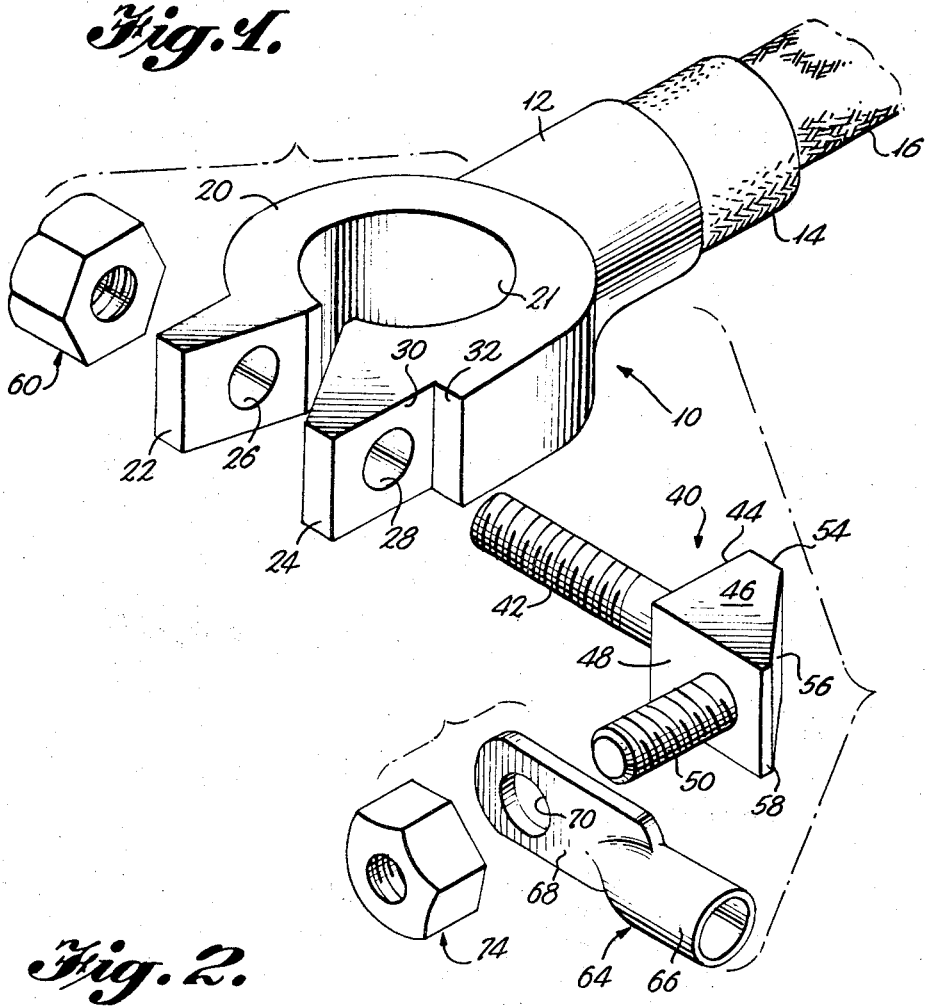
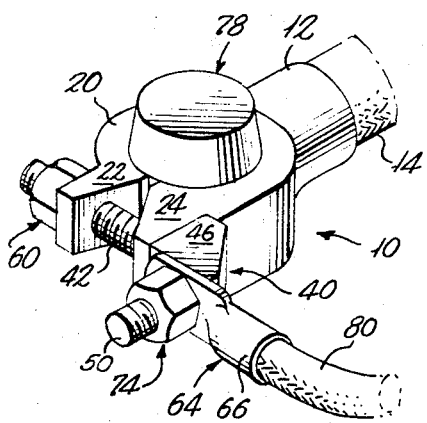
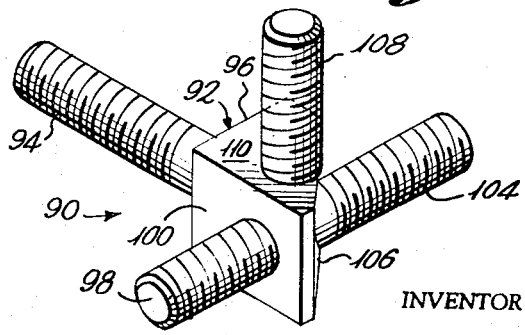
INVENTOR
Clarence B. Haegert
BY Shoemaker and Mattare
ATTORNEYS Oct. 22, 1968  C. B. HAEGERT  3,407,382
BATTERY CLAMP BOLT MEANS
Filed May 11, 1967  2 Sheets-Sheet 2
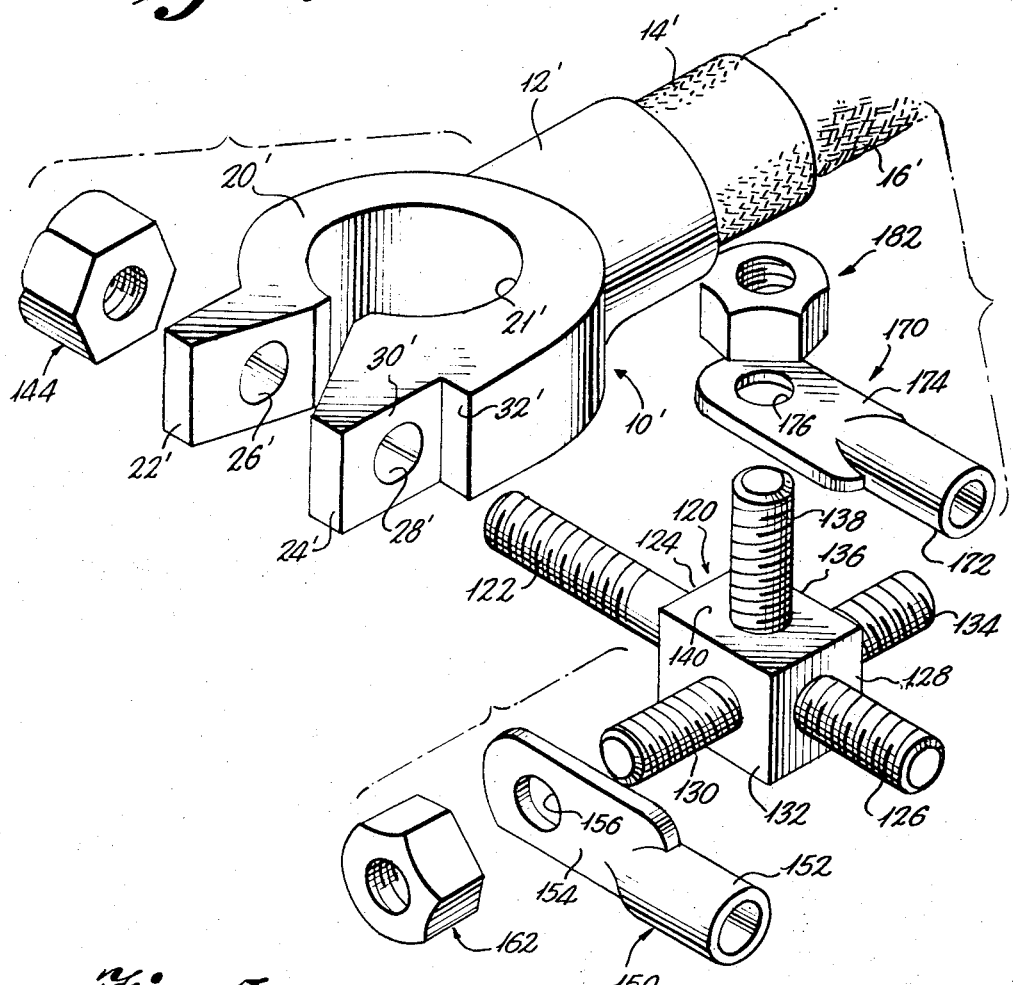
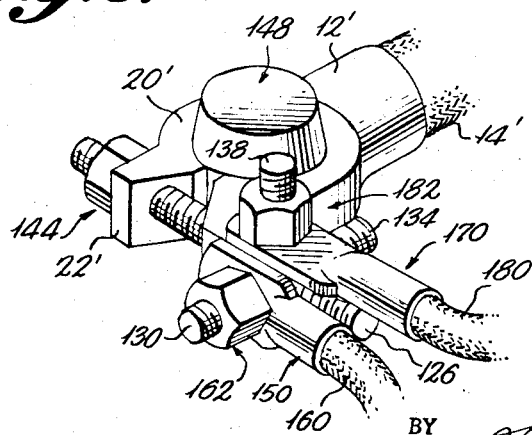
INVENTOR
Clarence B. Haegert
BY Shoemaker and Mattare
ATTORNEYS

United States Patent Office 3,407,382
Patented Oct. 22, 1968

3,407,382
BATTERY CLAMP BOLT MEANS
Clarence B. Haegert, P.O. Box 318,
Coffeyville, Kans. 67337
Filed May 11, 1967, Ser. No. 637,808
5 Claims. (Cl. 339—230)

ABSTRACT OF THE DISCLOSURE

The battery bolt of the present invention includes a first substantially cylindrical threaded shank portion which is adapted to extend through the aligned openings in the free spaced ends of a conventional battery clamp. An enlarged head portion is formed at one end of said first shank portion, this enlarged head having a plurality of flat faces thereon. A second substantially cylindrical threaded shank portion extends outwardly from said enlarged head portion, each of said shank portions extending substantially normally from one of said flat faces. The longitudinal axes of the two shank portions are disposed at substantially right angles to one another. The shank portions are also of substantially the same cross sectional dimension to provide a sturdy arrangement. A nut is adapted to be threaded upon the second shank portion for connecting an auxiliary electrical lead thereto. Additional threaded shank portions are provided in modified forms of the invention, these additional shank portions having longitudinal axes which extend substantially at right angles to various other of the shank portions.

Background of the invention

The bolt means of the present invention is adapted for use with a conventional battery terminal clamp and is expressly designed to allow additional auxiliary electrical leads to be connected thereto.

United States Patent No. 3,230,499 illustrates an arrangement wherein a battery clamp is provided with means for attaching additional auxiliary electrical leads thereto. The arrangement as shown for example in this patent has limited utility since the direction in which an auxiliary electrical lead is adapted to be attached thereto is limited to a single plane for any particular attachment means. This is of course disadvantageous since such auxiliary electrical leads may often come from various directions, and the attachment means should provide an arrangement for attaching the auxiliary electrical leads from many different directions and in different planes.

Additionally, the attachment means as illustrated in the aforementioned U.S. patent is of such a construction that it is not as sturdy as the conventional battery bolt construction, and in some instances it is important to provide an auxiliary attaching means of sturdy construction so that it will provide a strong construction comparable to that of the conventional battery bolt arrangement for drawing the free ends of the battery terminal clamp together.

Summary of the invention

The arrangement of the present invention enables auxiliary electrical leads to be attached to the bolt means in many different planes so that an almost universal connection is provided.

Additionally, the means for attaching the auxiliary electrical leads in the present invention is of a sturdy construction and may be of a cross sectional dimension substantially the same as that of the battery bolt means employed in the prior art so as to provide maximum strength and rigidity to the apparatus.

An object of the present invention is to provide a new and novel battery clamp bolt means which enables auxiliary electrical leads to be attached thereto in many different planes and from different directions, and wherein the attaching means provides a very sturdy arrangement.

Brief description of the drawings

FIG. 1 is a top perspective exploded view illustrating the bolt means of the present invention and the associated components;

FIG. 2 illustrates the structure of FIG. 1 on a reduced scale and in assembled relationship;

FIG. 3 illustrates a modified form of the bolt means shown in FIG. 1;

FIG. 4 is a view similar to FIG. 1 illustrating a still further modified form of the invention; and FIG. 5 illustrates on a reduced scale the assembled structure as illustrated in FIG. 4.

Description of the preferred embodiments

Referring now to the drawings wherein like reference characters designate corresponding parts throughout the several views, a first form of the invention is illustrated in FIG. 1.

A conventional battery clamp is indicated generally by reference numeral 10 and includes a tubular portion 12 which is adapted to be suitably connected with one end portion 14 of a battery cable 16.

The battery clamp includes a resilient clamping portion 20 defining an opening 20' therein which is suitably tapered so as to receive a correspondingly tapered battery terminal in the usual manner. The resilient clamping portion 20 includes free spaced ends 22 and 24 having aligned openings 26 and 28 formed therethrough for receiving a battery bolt.

The free end 24 is cutaway as indicated at 30 and defines a flat surface or shoulder 32 adapted to cooperate with a portion of an associated battery bolt to prevent turning of the battery bolt when mounted in operative position.

The bolt means of this form of the invention is indicated generally by reference numeral 40 and includes a first generally cylindrical threaded shank portion 42 which extends at right angles from a first flat face 44 of an enlarged head portion 46.

The enlarged head portion includes a second flat face 48 which extends substantially perpendicularly to flat face 44. A second threaded shank portion 50 extends outwardly at substantially right angles to flat face 48. Shank portion 50 is also substantially cylindrical and may have approximately the same cross sectional dimension as shank portion 42.

The enlarged head portion includes a flat face 54 which extends substantially perpendicularly to flat face 44 and is substantially parallel with flat face 48. A flat face 56 extends at an angle to face 54 and intersects a narrow flat face 58 which in turn extends substantially perpendicularly to the flat face 48.

The longitudinal axes of threaded shank portions 42 and 50 extend substantially at right angles to one another, and threaded shank 50 is disposed offcenter in the face 48, or in other words, it is disposed to the right of center of face 48 as seen in FIG. 1 so that when the bolt means is mounted in operative position relative to an associated battery clamp, adequate clearance will be provided for threading a nut onto shank portion 50.

A nut 60 is adapted to be threaded on the outer end of threaded shank portion 42 after the shank portion has been inserted through the aligned openings 26 and 28 of the free spaced ends of the battery clamp to draw these ends of the battery clamp toward one another to attach the clamp to an associated battery terminal. When the bolt means is so inserted in operative position relative to the battery clamp, the flat face 54 is adapted to engage the flat face 32 for preventing turning of the bolt means with respect to the battery clamp.

A lug indicated generally by reference numeral 64 includes a tubular portion 66 adapted to be connected with an auxiliary electrical lead. The lug also includes a flattened end portion 68 having a hole 70 formed therethrough which is adapted to receive threaded shank 50. A nut 74 is adapted to be threaded onto shank portion 50 after the lug has been placed thereover so that the lug may be clamped in operative position as seen in FIG. 2 relative to the bolt means.

As noted in FIG. 2, the battery clamp 10 is shown in operative position on a battery terminal 78. The shank portion 42 of the bolt means extends through the aligned openings provided in the free ends of the battery clamp, and nut 60 is threaded thereon for securing the clamp in operative position.

Lug 64 is illustrated as being operatively connected with an auxiliary electrical lead 80, the lug being held in clamped position by nut 74.

The bolt means has been illustrated in a particular position relative to the battery clamp as seen in FIG. 2. It should also be understood that the bolt means may be positioned so that the shank portion 50 extends in other directions relative to the shank portion 42. That is to say, the bolt means may be so adjusted that the shank portion 50 extends in any one of four positions relative to the shank portion 42. In other words, the shank portion 50 could extend in a direction opposite to that shown in FIG. 2, or in a direction such that it extends upwardly or downwardly displaced approximately 90° from the position shown. In each of these operative positions, one of the flat faces on the enlarged head of the bolt means is adapted to engage the flat face 32 on the battery clamp to prevent turning of the bolt means relative to the associated battery clamp.

It is accordingly apparent that an associated electrical lead may be operatively connected with the bolt means in any one of four separate and distinct planes thereby substantially enhancing the versatility of the apparatus.

Referring now to FIG. 3 of the drawings, a modified form of bolt means is illustrated wherein an enlarged head portion is indicated generally by reference numeral 92. A threaded shank portion 94 extends from a face 96 of the head portion, and a threaded shank portion 98 extends from a face 100 of the head portion. It will of course be noted that the head portion 92 as seen in this figure is substantially identical with the enlarged head portion 46 of the previously described form of the invention.

A further threaded shank portion 104 extends from face 106 of the enlarged head portion, while still another threaded shank portion 108 extends from the flat face 110 of the enlarged head portion.

It will be noted that threaded shank portions 98 and 104 are substantially aligned with one another while the longitudinal axes of these two threaded shank portions are substantially perpendicular to the longitudinal axis of threaded shank portion 94 as well as threaded shank portion 108. The longitudinal axes of threaded shank portions 94 and 108 are also substantially perpendicular to one another.

It will be apparent that the bolt means as shown in FIG. 3 can be readily employed with the battery clamp 10 shown in FIG. 10, and that three different auxiliary electrical leads may be connected with the threaded shanks 98, 108 and 104 as desired.

Referring now to FIGS. 4 and 5 of the drawings, still a further modified form of the invention is illustrated. The battery clamp and associated battery cable are identical in construction with that previously described, and accordingly these components have been given the same reference numerals primed in FIGS. 4 and 5.

The bolt means in this form of the invention includes an enlarged head portion indicated generally by reference numeral 120. The enlarged head portion in this form of the invention may be in the shape of a cube. A first threaded shank portion 122 extends from a flat face 124 of the enlarged head portion, and a second threaded shank portion 126 extends from an opposite flat face 128. The longitudinal axes of threaded shank portions 122 and 126 are substantially aligned with one another.

A threaded shank portion 130 extends from a flat face 132 of the enlarged head portion, and a further threaded shank portion 134 extends from the opposite flat face 136. The longitudinal axes of shank portions 130 and 134 are aligned with one another and extend substantially perpendicularly to the longitudinal axes of shank portions 122 and 126.

Still another threaded shank portion 138 extends from an upper flat face 140 of the enlarged head portion. The longitudinal axis of this last-mentioned threaded shank portion extends substantially perpendicularly to the longitudinal axes of the aforementioned shank portions.

The threaded shank portion 122 extends through the aligned holes 26' and 28' of the battery clamp 10', and a nut 144 is threaded on the outer end thereof for holding the battery clamp in operative position about a battery terminal 148 as seen in FIG. 5.

Referring to FIG. 4, a lug 150 includes a tubular portion 152 which terminates in a flattened portion 154 having a hole 156 formed therethrough which receives the threaded shank portion 130. As seen in FIG. 5, an electrical lead 160 is operatively connected with lug 150 and a nut 162 is threaded on the outer end of shank portion 130 for holding the lug in operative position.

Referring again to FIG. 4, another lug 170 includes a tubular portion 172 which terminates in a flattened portion 174 having a hole 176 formed therethrough which receives threaded shank portion 138. As seen in FIG. 5, lug 170 is illustrated as being operatively connected with an auxiliary electrical lead 180, and a nut 182 is threaded about the threaded shank portion 138 for maintaining lug 170 in operative position.

It will be understood that lugs or other suitable connecting means may be operatively connected with each of the threaded shank portions of the bolt means illustrated in this form of the invention.

Here again, it is apparent that auxiliary electrical leads may be connected with the bolt means in a plurality of different planes thereby providing maximum versatility when utilizing the apparatus.

It is apparent from the foregoing that there is provided according to the present invention new and novel battery clamp bolt means wherein auxiliary electrical leads may be connected thereto in a plurality of different planes, and wherein the attaching means for connecting auxiliary leads to the bolt means is of a sturdy construction.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form functional as well as conjointly cooperative equivalents are therefore intended to be embraced by those claims.

I claim:

1. In combination, a battery clamp including a resilient clamping portion defining an opening adapted to receive a battery terminal and comprising free spaced ends having aligned openings formed therethrough, a bolt including a first threaded shank portion extending through the aligned openings of an associated battery clamp and receiving a nut to tighten an associated battery clamp on a battery terminal, said bolt including an enlarged head portion formed at one end of said first shank portion, a second threaded shank portion extending from said enlarged head portion for receiving a nut to attach an auxiliary electrical lead to said bolt, said second shank portion being spaced from said first shank portion and each of said shank portions having a longitudinal axis, the longitudinal axis of said second shank portion extending at an angle to the longitudinal axis of said first shank portion, said enlarged head portion including at least two substantially flat faces disposed at an angle to one another, one of said faces being disposed adjacent one of the free ends of said battery clamp, each of said shank portions extending substantially normally from a different one of said faces, said second shank portion extending from said one face and being disposed offcenter thereof to provide clearance with the adjacent free end of the battery clamp.

2. Appaartus as defined in claim 1 wherein said enlarged head portion of the bolt has a flat surface formed thereon for engaging a surface of said battery clamp to prevent turning of said bolt with respect to the battery clamp when in operative position.

3. Apparatus as defined in claim 1 wherein the longitudinal axis of said second shank portion extends at substantially right angles to the longitudinal axis of said first shank portion.

4. Apparatus as defined in claim 1 wherein said second shank portion is of substantially the same cross sectional dimension as said first shank portion to provide a sturdy arrangement.

5. Apparatus as defined in claim 1 including at least one additional shank portion having a longitudinal axis, the longitudinal axis of said additional shank portion extending at an angle to the longitudinal axis of at least one of said first and second shank portions.

References Cited

UNITED STATES PATENTS

| | | |
|---|---|---|
| 2,142,388 | 1/1939 | Wallace. |
| 2,425,935 | 8/1947 | Hayman. |
| 3,230,499 | 1/1966 | Haegert _____ 339—230 |
| 3,243,764 | 3/1966 | McGrane et al. _____ 339—242 |

FOREIGN PATENTS 136,372  12/1919  Great Britain.

MARVIN A. CHAMPION, *Primary Examiner.*

P. TEITELBAUM, *Assistant Examiner.*